April 22, 1941.    J. L. ADAMS    2,239,072

TOOL

Filed March 2, 1939

INVENTOR.

JOSEPH L. ADAMS

BY
*Kwis Hudson & Kent*

ATTORNEYS

Patented Apr. 22, 1941

2,239,072

UNITED STATES PATENT OFFICE 2,239,072

TOOL

Joseph L. Adams, Cleveland, Ohio, assignor to The Dill Manufacturing Company, Cleveland, Ohio, a corporation of Ohio Application March 2, 1939, Serial No. 259,427

2 Claims. (Cl. 81—55)

The present invention relates to tools adapted for applying fasteners employed to secure together members accessible from only one side, and more particularly to a tool especially adapted for applying fasteners of the type disclosed in U. S. patent to Anderson No. 2,051,066.

An object of the present invention is the provision of a novel, simple, and efficient tool for quickly and securely applying fasteners comprising two relatively rotatable members used to secure members together where access can be had to one side only, especially fasteners of the type disclosed in the above-mentioned patent.

The invention resides in certain details of construction and combinations and arrangements of parts, and further objects and advantages will be apparent to those skilled in the art to which the invention relates from the following description of the preferred embodiment thereof described with reference to the accompanying drawing forming a part of this specification in which similar reference characters designate corresponding parts and in which Fig. 1 is an elevation of a tool embodying the present invention and showing the same connected with a power actuating device;

Figure 4:
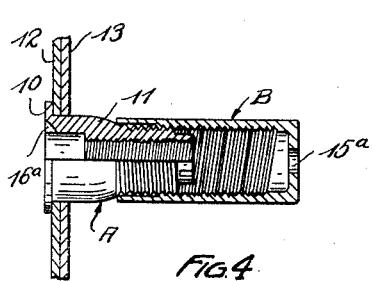
Fig. 4 is an enlarged section, with portions in elevation, of a fastener of the type adapted to be applied by the present tool, the fastener being shown in position ready for riveting.
Figure 3:
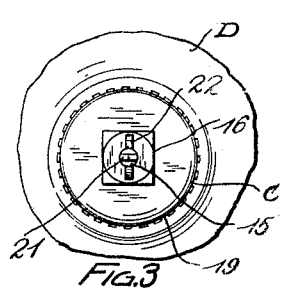
Fig. 3 is an end elevation of the tool, viewed as indicated by the line 3—3 of Fig. 2.
Figure 5:
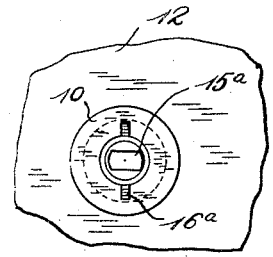
Fig. 5 is an end view of the fastener shown in Fig. 4.

The tool of the present invention is particularly adapted for applying two-part fasteners of the type shown in U. S. patent to Anderson, No. 2,051,066. These fasteners comprise two concentric sleeves A and B (see Figs. 4 and 5), the inner sleeve A of which is provided with a head 10 and with a shank having an enlarged portion 11 thereon adjacent to such head. The outer sleeve B is open at one end, which may be referred to as its outer or upper end, and is adapted to be threaded onto the reduced portion of shank of the inner sleeve A. The two sleeves when initially assembled form a shank of substantially uniform diameter adapted to be inserted through suitable aligned apertures in members 12 and 13 which it is desired to secure together and to which access can be had from only one side. After the fastener is properly positioned in the apertures, the two sleeves are rotated relative to each other and the threaded engagement therebetween causes the open end of the outer sleeve B to move up over the enlarged portion 11 of the shank of the inner sleeve A, thus expanding the open end of the outer sleeve B. When the head 10 of the inner sleeve A and the open end of the outer sleeve B abut opposite sides of the members which it is desired to fasten together, further relative rotation of the two sleeves is impossible and the members are then securely fastened together.

To facilitate rotation of the sleeve B, the right-hand closed end thereof is provided with suitable means adapted to receive a driving member. In the present instance the closed end of the sleeve B has an elongated slot 15a formed therein adapted to receive a suitably formed driver portion of a riveting tool. The head 10 of the sleeve A is also provided with suitable means adapted to be engaged by a tool which either holds the sleeve A stationary while the sleeve B is being rotated, or as an alternative, rotates the sleeve A relative to the sleeve B. In the fastener shown, the head 10 is provided with slots 16a adapted to receive a spanner wrench or screw driver. Ordinarily, in applying a fastener of this type, the sleeve A is held stationary while the sleeve B is rotated, but alternatively, the sleeve A may be rotated and the sleeve B held stationary, or both the sleeves may be rotated in opposite directions. The direction of the relative rotation between the two sleeves required to apply the fastener is determined by whether the threaded connection therebetween is a right- or left-hand thread.

Figure 1:
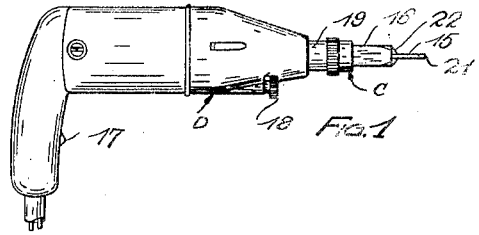
Figure 2:
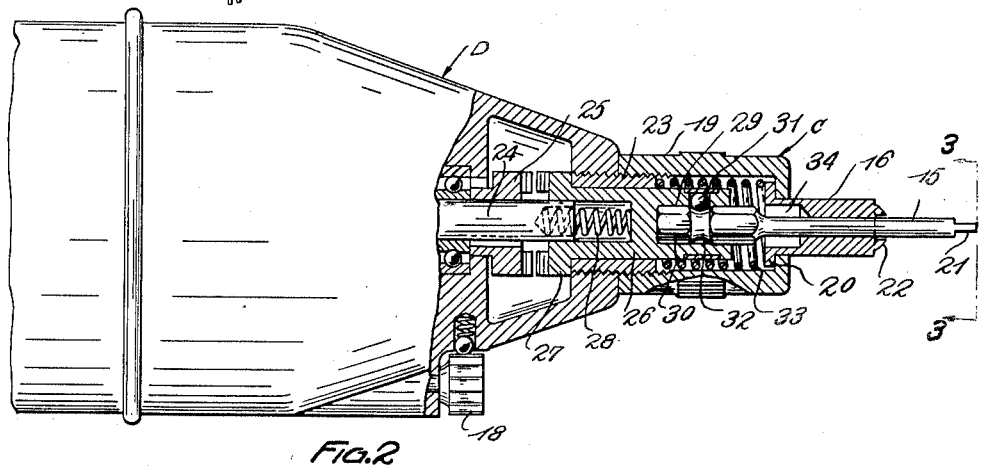
Fig. 2 is a longitudinal section taken through the tool and through a portion of the power device.

The tool C which I have devised for applying fasteners of the type above described in shown in Figs. 1 and 2 of the drawing and may be actuated by any suitable driving means. In this instance I show the tool C connected with a power device D for that purpose. This power device may be one of a commercially available form, that is to say, it may be electrically driven and may have a control switch 17 thereon. This device may also have an adjusting means 18 thereon for varying the maximum torque which it will deliver.

The tool C comprises a screw driver-like member or tool element 15 and a spanner-like member or second tool element 16, and an internally threaded member or casing 19 for connecting the tool elements with the power device D. The tool element 16 has a head portion 20 retained in the casing 19 and may be in the form of a sleeve through which the tool element 15 extends, the latter preferably being in the form of a rod or spindle which is slidable in the hollow element 16. The tool element 15 is provided at its outer or lower end with a screw driver-like portion 21 which is adapted for driving engagement in the slot 15a of the sleeve B of the fastener when the tool is applied thereto. The tool element 16 has a shank of non-circular cross-section by which it is held against rotation in the casing 19 and is provided at its outer or lower end with screw driver-like or spanner lugs 22 which are adapted for driving or holding engagement in the slots 16a of the sleeve A of the fastener.

As shown in Fig. 2, the power device D may have an externally threaded bushing or stem 23 projecting therefrom and the tool C may be connected with the power device by screwing the casing 19 onto such stem or bushing. The power device D may also have a rotatable drive spindle 24 therein which carries a toothed clutch member 25. A chuck member 26 is axially slidable in the bushing or stem 23 and at its inner end carries a toothed clutch member 27 adapted for cooperation with the clutch member 25. A spring 28 disposed between the drive spindle 24 and the chuck member 26 normally holds the latter in the position shown in Fig. 2 with the clutch members 25 and 27 in disengaged relation but permits inward movement of the chuck member 26 to cause engagement of the clutch members when driving torque is to be delivered to the tool C. The outer end of the chuck member 26 of the power device D is adapted for driving connection with the element 15 of the tool C and, for this purpose, may be provided with a non-circular recess 29 in which a correspondingly shaped head 30 of the tool element 15 is seated. The tool element 15 may be held seated in the recess 29 of the member 26 by providing the latter with a ball-type locking detent 31 adapted to engage in a peripheral groove 32 of the head 30.

The hollow tool element 16 is adapted to have limited axial shifting in the casing 19 but is normally held in an extended position, as shown in Fig. 2, by a suitable compression spring 33 disposed in the casing and acting against the head 20. Interference between the inner end of the tool element 16 and the head 30 of the tool element 15 may be prevented by providing the tool element 16 with a suitable recess or counterbore 34 of a size to receive the head 30.

When a two-part fastener of the type comprising the threadedly connected sleeves A and B is to be riveted by means of my tool C, the fastener is first inserted into the aligned openings of the parts 12 and 13 to be connected, as above explained, and the tool is then applied to the fastener by inserting the tool elements 15 and 16 thereinto. When the tool is applied to the fastener, the spanner lugs 22 of the tool element 16 first engage in the slots 16a of the sleeve A and, after this has taken place, axial pressure is applied to the power device D causing the tool element 16 to move part way into the casing 19 against the force of the compression spring 33. The relative axial movement thus produced between the tool elements 15 and 16 causes the screw driver portion 21 of the tool element 15 to engage in the slot 15a of the sleeve B. After the screw driver portion 21 of the tool element 15 engages in the slot 15a, further axial pressure applied to the power device D causes the tool element 15 to recede into the casing 19, thereby pushing the chuck member 26 axially inwardly against the action of the spring 28 and engaging the toothed clutch member 27 with the toothed clutch member 25. When this clutch engagement takes place, the tool element 15 will be driven by the power device and will cause rotation of the sleeve B of the fastener. While the sleeve B is being thus rotated, the sleeve A will be held against rotation by the spanner lugs 22 of the tool element 16 and, as explained above, such relative rotation between the sleeves of the fastener will cause the open end of the sleeve B to ride up over the enlarged portion 11 of the sleeve A and thereby expand or rivet it for clamping cooperation with the head 10. After the sleeve B has been thus expanded or riveted, the elements 15 and 16 of the tool C can be readily disengaged from the fastener. Alternatively the fastener may first be applied to the tool and the driving connections on the latter engaged with the tool receiving means of the fastener and the whole subsequently inserted into the aligned apertures in the members to be connected.

From the foregoing description of the preferred embodiment of the invention, it will be apparent that the objects of the invention heretofore enumerated and others have been accomplished; that an efficient, simple and reliable tool has been provided which is especially adapted for quickly and securely applying fasteners of the character disclosed in the aforesaid U. S. patent. While the preferred embodiment of the invention has been described with considerable detail, I do not wish to be limited to the particular construction shown, which construction may be varied within the scope of this invention. It is my intention to cover hereby all adaptations and modifications and arrangements thereof that come within the practice of those skilled in the art to which the present invention relates, and I particularly point out and claim as my invention the following:

1. A tool for use with a fastener of the type having two concentric members threadedly connected and provided with axially spaced tool receiving means for imparting relative rotation thereto comprising a housing, a tool element slidably but non-rotatably supported in said housing with one end projecting therefrom, resilient means for continuously urging said tool element in a direction to project the same from said housing, a driving connection on the projecting end of said tool element engageable with the tool receiving means on the internal member of the fastener, a second tool element slidably and rotatably supported within the first-named tool element with one end thereof projecting forwardly beyond the latter, a driving connection on the forwardly projecting end of said second tool element engageable with the tool receiving means on the external member of the fastener, power means for rotating said second tool element, said power means comprising a normally disengaged clutch adapted to be engaged by axial movement of said second tool element, and resilient means for continuously urging said second tool element in a direction to project the same from said first-named tool element and to disengage the clutch.

2. A tool for use with a fastener of the type having two concentric members threadedly connected and provided with axially spaced tool receiving means for imparting relative rotation thereto comprising a housing, a tool element slidably but non-rotatably supported in said housing with one end projecting therefrom, resilient means for continuously urging said tool element in a direction to project the same from said housing, a driving connection on the projecting end of said tool element engageable with the tool receiving means of the internal member of the fastener, a second tool element slidably and rotatably supported within the first-named tool element with one end thereof projecting forwardly beyond the latter, a driving connection on the forwardly projecting end of said second tool element engageable with the tool receiving means of the external member of the fastener, power means for rotating said second tool element, said power means comprising a normally disengaged clutch adapted to be engaged by axial movement of said second tool element, resilient means for continuously urging said second tool element in a direction to project the same from said first-named tool element and to disengage the clutch, and an abutment on said second tool element adapted to limit the movement thereof relative to the external member of the fastener.

JOSEPH L. ADAMS.